United States Patent Office 3,000,690
Patented Sept. 19, 1961

3,000,690
NEW POLYMERS OF UNSATURATED GLYCIDYL ETHERS AND METHODS FOR PRODUCING THEM
Guy C. Murdoch, Levittown, and Henry J. Schneider, Hatboro, Pa., assignors to Rohm & Haas Company, Philadelphia, Pa., a corporation of Delaware
No Drawing. Original application Feb. 7, 1956, Ser. No. 563,425. Divided and this application Jan. 16, 1958, Ser. No. 709,179
17 Claims. (Cl. 8—128)

This invention relates to polymers of new vinyl ethers and sulfides containing a glycidyl radical obtained by the addition polymerization of such new unsaturated glycidyl ethers and/or by the condensation polymerization thereof through the oxirane linkage. This invention also includes methods for producing the new polymeric compounds. This application is a division of copending application Serial No. 563,425, filed February 7, 1956.

The compounds of the invention are polymers of those compounds having the formula I:

I       $CH_2=CHXAOCH_2CH{-}{-}CH_2$
                                     \\ / \\
                                         X where
X is selected from the group consisting of O and S, and
A is selected from the group consisting of alkylene groups having 2 to 12 carbon atoms which may be substituted with cycloalkyl groups, such as cyclohexyl, aryl groups, such as phenyl, chlorophenyl, etc., and aralkyl groups such as benzyl; and groups of the formula —$(C_nH_{2n}X)_xC_nH_{2n}$—, where $n$ is an integer having a value of 2 to 12 and $x$ is an integer having a value of 1 to 5. The compounds of Formula I may be obtained by the reaction of a compound of Formula II with a compound of Formula III:

II              $YCH_2CH{-}{-}CH_2$
                             \\ / \\
                              X

III             $CH_2=CHXAOZ$ where
Y is selected from the group consisting of Cl and Br, and
Z is an alkali metal, such as sodium, potassium, or lithium.

The alkali metal alcoholate of Formula III may be obtained by the reaction of an alkali metal, such as of sodium, potassium, or lithium, or an alkali metal hydroxide or alkoxide with a corresponding alcohol having the formula IV:

IV             $CH_2=CHXAOH$ under the usual conditions of carrying out this type of reaction for producing other alkali metal alcoholates. Examples of the alcohols from which the alkali metal alcoholate of Formula III may be produced include: β-hydroxyethyl vinyl ether, β-hydroxyethyl vinyl sulfide, 3-hydroxypropyl vinly ether, 3-hydroxypropyl vinyl sulfide, β-hydroxy-α-methl-ethyl vinyl ether, β-hydroxy-α-methyl-ethyl vinyl sulfide, β-hydroxypropyl vinyl ether, β-hydroxypropyl vinyl sulfide, 5-hdroxypentyl vinyl ether, 5-hydroxypentyl vinyl sulfide, β-hydroxy-α-phenyl-ethyl vinyl ether, β-hydroxy-α-phenyl-ethyl vinyl sulfide, 8-hydroxyoctyl vinyl ether, 8-hydroxyoctyl vinyl sulfide, 12-hydroxylauryl vinyl ether, 12-hydroxylauryl vinyl sulfide, β-hydroxyethoxyethyl ether, β-hydroxyethoxyethyl vinyl sulfide, β-hydroxyethylthioethyl vinyl ether, β-hydroxyethylthioethyl vinyl sulfide, and compounds of the formulas:

$CH_2=CHOCH(CH_3)CH_2OCH(CH_3)CH_2OH$
$CH_2=CHOCH(CH_3)CH_2SCH(CH_3)CH_2OH$
$CH_2=CHOCH_2CH(CH_3)OCH_2CH(CH_3)OH$
$CH_2=CHOCH_2CH(CH_3)SCH_2CH(CH_3)OH$
$CH_2=CHOC_2H_4OC_2H_4OC_2H_4OH$
$CH_2=CHOC_2H_4SC_2H_4SC_2H_4OH$
$CH_2=CHOCH(CH_3)CH_2OCH$
                                        $(CH_3)CH_2OCH(CH_3)CH_2OH$
$CH_2=CHOCH(CH_3)CH_2SCH$
                                        $(CH_3)CH_2SCH(CH_3)CH_2OH$
$CH_2=CHO(CH_2CH_2O)_5CH_2CH_2OH$
$CH_2=CHO(CH_2CH_2S)_5CH_2CH_2OH$

Compounds of Formula I are useful as stabilizers for various halogen-containing polymeric materials including polyvinyl chloride, polyvinylidene chloride, and copolymers of vinyl chloride or vinylidene chloride with other monoethylenically unsaturated monomers like vinyl acetate, acrylonitrile, methyl acrylate, and so on.

The compounds of Formula I may be included in aminoplast resin-forming condensates such as those of urea-formaldehyde, triazine-aldehyde, such as melamine-formaldehyde, and the like to modify the properties of such condensates and the products made therefrom which may be molded articles or finishes on textiles as in the crease-proofing of textiles or the treatment thereof for water-proofing, for increasing water-repellency, or for reducing shrinkage thereof. The curing operation conventionally employed in conjunction with such aminoplast resins serves to cause polymerization of the compounds of Formula I by opening up the oxirane unit and condensation with the aminoplast components. The curing or baking operations are generally carried out in the presence of an acid catalyst, examples of which are disclosed hereinafter, at temperatures of 150° to 450° C. for periods of 10 seconds to one hour, the period generally being of a duration inversely proportional to the temperature. Such modified aminoplast condensates may be employed as adhesives or in the making of coatings for all sorts of substrates including wood, metal, leather, and so on.

The compounds of Formula I are particularly valuable in the preparation of polymeric materials by addition polymerization by bulk, solution, emulsion, or suspension techniques with the production of thermoplastic products and generally soluble products that are adapted to be applied to various uses, and especially as coatings. After application, such as in the coatings referred to, the dried films or other structures may be subjected to an ageing, baking, or curing operation to cross-link the polymer through the oxirane linkage to increase the solvent resistance and to reduce the thermoplasticity of the films or articles. Thus, glycidyl compounds of the kind covered by Formula I provide the plastics chemist and resin formulator, and workers in related arts, with a single polymerizable material which can be caused to undergo either or both of two types of polymerization reactions. The advantages of such a polymerizable compound include, for example, the greater adaptability of such compounds for a wider variety of service applications by merely varying the catalyst or other polymerization influences employed, so as to direct the course of the polymerization through the ethylenic linkage and/or the epoxy grouping as desired or as conditions may require.

One important aspect of the present invention is based on our discovery that new and useful classes of polymerizable compositions and polymerized products, including reactive polymerization products, can be prepared by compounding, as for example by forming a homogeneous, or substantially homogeneous, mixture or blend, of a glycidyl ether of the kind embraced by Formula I and a monoethylenically or diethylenically unsaturated compound (or a plurality of such compounds) which is different from the said glycidyl ether and is copolymerizable therewith and then polymerizing the resulting mixture or blend as hereinafter more fully described. The glycidyl ether and the other copolymerizable monomer may be employed in any proportions, the chosen proportions being dependent largely upon economic considerations and the intended use of the polymerization product, that is, the particular properties desired in the copolymer. It has been found that copolymerization can be caused to take place primarily through the ethylenically unsaturated groupings of the respective comonomers, yielding a reactive copolymer which can be caused to polymerize further as a result of opening up or rupturing of the epoxy groups present therein.

In forming the thermoplastic addition polymers, suitable monoethylenically unsaturated compounds may be used including acrylic acid, methacrylic acid, (which acids may be generically represented by means of the formula

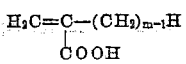

wherein $m$ is an integer having a value of 1 to 2), esters of acrylic acid or methacrylic acid and monohydric alcohols such as methyl, ethyl, butyl, octyl, dodecyl, cyclohexyl, undecenyl, cyanoethyl, dimethylaminoethyl, and the like; esters of itaconic acid and similar alcohols; esters from maleic, fumaric or citraconic acids, and likewise similar alcohols; vinyl esters of carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, hydroxyethyl vinyl ether, aminoethyl vinyl ether, aminopropyl vinyl ether, dimethylaminoethyl vinyl ether, vinyloxyethoxyethanol, vinyloxypropoxyethanol; vinyl sulfides, such as methyl, ethyl, propyl, n-butyl, etc., vinyl sulfide, hydroxyethyl vinyl sulfide, vinyl thioglycerol, vinyl α-thioethyl acetate, methacrylonitrile or acrylonitrile; acrylamide or methacrylamide, and N-substituted amides of these types; vinyl chloride, vinyl bromide, vinylidene chloride, 1-chloro-1-fluoroethylene, or ethylene; N-vinyl amides, such as N-vinyl-pyrrolidone, or N-vinyl-alkyl-substituted pyrrolidones where 1 to 3 alkyl groups of 1 to 5 carbon atoms each may be present; N-vinyl caprolactam, N-vinyl-N,N'-ethyleneurea; and styrene.

The polymerization of compounds of Formula I with or without the comonomers mentioned may be effected in the presence of any of the so-called free radical catalysts or initiators such as an organic or inorganic peroxide catalyst, peroxy catalysts, such as persulfates and the azo catalysts. From 0.1% to 3% or more of the initiator or catalyst may be used, based on the total weight of the monomers. Examples of organic peroxide catalysts that may be used include benzoyl peroxide, acetyl peroxide, capropyl peroxide, butyl perbenzoates, butyl hydroperoxide. Examples of azo catalysts include azodiisobutyronitrile, azodiisobutyramide, dimethyl or diethyl or dibutyl azodiisobutyrate, azobis(α,γ-dimethylvaleronitrile), azobis(α-methylbutyronitrile), azobis(α-methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain-transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution, depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble, after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxypolyethoxyethanols in which the alkyl has from 6 to 18 carbon atoms, such as octyl, dodecyl, or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)trimethylammonium chloride, and so on.

The polymers of the compounds of Formula I may be employed to reduce shrinkage of fabrics of wool, cotton, and rayon, and in this connection it has been found that they are surprisingly effective for the stabilization of wool fabrics. The polymers may also be incorporated as modifiers in aminoplast resins of the type mentioned hereinabove for the production of molded products and various formed articles, such as films, fibers, rods, tubes or cast shaped articles, and for the production of coatings on leather, paper, textile, wood, and so on for imparting water-repellency, water-proofing effects or crease-proofing effects. When applied to textiles or other articles for reducing shrinkage, crease-proofing or the like, the coatings or films produced may be subjected to a baking or curing operation at temperatures of 150° to 450° C. for periods of 10 seconds to one hour, the time being inversely proportional to the temperature. Optionally acid catalysts may be used to accelerate the curing. Examples of acid catalysts which effect cross-linking through the opening up of the epoxy grouping of the glycidyl ether are cumylsuccinic acid, maleic anhydride, paratoluene sulfonic acid, sulfuric acid, phosphoric acid, aluminum chloride, stannic chloride, ferric chloride, and the like. Similar curing or baking operations may be applied to formed articles of the thermoplastic polymers of the compound of Formula I under the conditions just stated optionally in the presence of an acid catalyst to effect cross-linking with consequent reduction in susceptibility to solvents and reduction in thermoplasticity. In the making of molded articles, pigments, dyes, opacifiers, fillers, mold lubricants and so on may be incorporated in the usual proportions to provide coloring or other modification of the product.

The polymers of the present invention are useful as blending agents for preformed polymers of halogen-containing monoethylenically unsaturated monomers, such as those of vinyl chloride or vinylidene chloride, including their homopolymers as well as their copolymers with other monomers, such as vinyl acetate, acrylonitrile, etc., to improve the heat- and light-stability and, at the same time, to plasticize the polymers. It appears that the improved stability imparted to such halogen-containing polymers is attributable to the oxirane or thiirane linkage.

Copolymers of the compounds of Formula I with carboxylic acid-containing monomers, such as acrylic acid, methacrylic acid, itaconic acid, crotonic acid, maleic acid and so on, with or without other comonomers, provide improved polymeric compositions containing acid groups adapted to co-react with the epoxy linkage upon its opening during the curing or baking stage. Such copolymers generally provide for more rapid cross-linking under less severe reaction conditions or baking conditions.

As compared to glycidyl esters, such as glycidyl acrylate, the glycidyl compounds of Formula I are generally far more resistant to hydrolysis under acid conditions since they lack the ester linkage. The curing under acid conditions of the polymers of the present invention, therefore, generally avoids loss of flexibility, softness and toughness, which is characteristic of the curing of glycidyl ester-polymers as a result of the hydrolysis of a considerable portion of the glycidyl groups and consequent breaking of many of the cross-links in the polymers of the glycidyl esters.

In the following examples, which are illustrative of the invention, the parts are by weight unless otherwise noted:

EXAMPLE 1

Diethyl ether (7.8 grams) and twenty drops of 45% $BF_3$ etherate are combined in a 300 ml. flask. This mixture is cooled by an ice-water bath and a solution of 2-vinyloxyethyl glycidyl ether (15.2 grams, 0.11 mole) in diethyl ether (31.2 grams) is added dropwise with stirring. After stirring the vinyl ether and catalyst together at ice temperature for four hours, the temperature is raised slowly to 36° C. (reflux). The resulting polymer is extracted by diethyl ether in a Soxhlet apparatus. The insoluble portion (5.9 grams) is dried in a vacuum oven to constant weight. The ether extract is evaporated. The residual oil is redissolved in benzene, reprecipitated in n-heptane and dried in the vacuum oven yielding a soluble polymer (2.5 grams) which contains no appreciable oxirane function.

EXAMPLE 2

2-(vinylthio)ethyl glycidyl ether (15.83 grams, 0.099 mole) is polymerized in bulk by charging together with 2,2'-azo-bis-isobutyronitrile (0.13 gram) to a screw-cap jar and heating to 80° to 100° C. for twenty-four hours. The product, a viscous pale yellow liquid is purified by two precipitations from toluene into methanol, yielding the liquid homopolymer (6.7 grams), 98.5% pure by sulfur analysis, 85.9% by oxirane analysis.

EXAMPLE 3

(a) Bulk copolymerization of styrene (19.92 grams, 0.192 mole) with 2-(vinylthio)ethyl glycidyl ether (5.03 grams, 0.031 mole) is carried out in a screw-capped glass jar, with benzoyl peroxide (0.12 gram) catalyst, in a steam-heated oven (80° to 100° C.) overnight. The polymer is reprecipitated twice (from benzene into methanol) and dried in a vacuum oven. The product (6.4 grams) is a white, brittle solid, containing 6.50 mole percent of the glycidyl ether by sulfur analysis, 3.88 mole percent by oxirane oxygen analysis.

(b) Bulk copolymerization of styrene (19.86 grams, 0.191 mole) and 2-(vinylthio)ethyl glycidyl ether (5.02 grams, 0.031 mole) is carried out in like manner, except that 2,2'-azo-bis-isobutyronitrile (0.15 gram) is used as catalyst. The product (13.0 grams) contains 5.02 mole percent of the glycidyl ether, by sulfur analysis. The properties are identical to the product described in part (a) above.

(c) Bulk copolymerization of vinyl acetate (5.03 grams, 0.057 mole) with 2-(vinylthio)ethyl glycidyl ether (10.04 grams, 0.063 mole) is carried out by the procedure described in part (b) above. The product (8.0 grams) is a viscous liquid polymer.

(d) Bulk copolymerization of acrylonitrile (14.91 grams, 0.282 mole) with 2-(vinylthio)ethyl glycidyl ether (4.03 grams, 0.025 mole) by the procedure described in part (b) gives an insoluble polymer (12.7 grams) containing 17.8 mole percent glycidyl ether, by sulfur analysis. The product is purified by extraction with diethyl ether in a Soxhlet apparatus, followed by drying in a vacuum oven.

(e) Bulk copolymerization of diethyl maleate (15.10 grams, 0.088 mole) with 2-(vinylthio)ethyl glycidyl ether (3.96 grams, 0.025 mole) by the procedure described in part (b) above yields a mixture of a soluble polymer (2.5 grams) containing 36.9 mole percent glycidyl ether by sulfur analysis and an insoluble polymer (5.8 grams) containing 52.5 mole percent glycidyl ether by sulfur analysis. The polymers are separated by Soxhlet extraction.

(f) Bulk copolymerization of ethyl acrylate (14.89 grams, 0.150 mole) and 2-vinyloxyethyl glycidyl ether (2.06 grams, 0.014 mole) is carried out by the procedure described in part (a) above. The clear-glassy polymer (10.0 grams) contains 3.75 mole percent glycidyl ether by oxirane oxygen analysis.

EXAMPLE 4

Maleic anhydride (7.2 grams, 0.075 mole) and 2-vinyloxyethyl glycidyl ether (10.2 grams, 0.073 mole) are charged together with benzene (132.8 grams) and benzoyl peroxide (0.8 gram) to a 300 ml. flask. The mixture is heated to reflux, with stirring for three hours. The precipitated polymer is extracted by diethyl ether in a Soxhlet apparatus and dried in a vacuum oven. The white, powdery copolymer produced (16.6 grams) is soluble in strong aqueous caustic.

EXAMPLE 5

2-vinyloxyethyl glycidyl ether (6.5 grams, 0.05 mole), deionized water (90.5 grams), ammonium persulfate (0.25 gram) and sodium hydroxyoctadecane sulfonate (7.6 grams) are charged to a 250 ml. autoclave and cooled in a Dry Ice-acetone bath. Vinyl chloride (61.0 grams, 0.99 mole) is added as a liquid and the autoclave is capped quickly. The emulsion is stirred for twenty-six hours at 40° to 56° C. The autoclave is vented, the emulsion broken and the raw polymer (39.5 grams) separated and dried. The polymer is further purified by reprecipitation. The white, powdery copolymer contains 1.5 mole percent glycidyl ether by oxirane oxygen analysis, 3.8 mole percent by chlorine analysis.

EXAMPLE 6

(a) 2-(vinylthio)ethyl glycidyl ether (1.25 grams, 0.01 mole) benzene (45.9 grams) and 2,2'-azo-bis-isobutyronitrile (1.0 gram) are charged to a 250 ml. autoclave. Vinyl chloride (104.5 grams, 1.70 moles) is added in the manner described in Example 5 above. The solution is stirred at 64° C. for twenty-one-hours. The polymer is precipitated twice (from tetrahydrofurane into methanol) and dried. The white, powdery copolymer (55 grams) contains 0.17 mole percent glycidyl ether by sulfur analysis, 2.8 mole percent by chlorine analysis.

(b) 5-vinyloxypentyl glycidyl ether (28.5 grams, 0.15 mole) and vinyl chloride (102.5 grams, 1.67 moles) are solution copolymerized by the method described in part (a) above. The white, powdery copolymer (34.5 grams) contains 2.6 mole percent glycidyl ether by oxirane oxygen analysis, 12.0 mole percent by chlorine analysis.

EXAMPLE 7

Polymerization mixtures each containing 50 parts of monomeric material, 50 parts of toluene, and 0.25 part of azo-diisobutyronitrile are heated under reflux in a glass reaction vessel for 24 hours, further additions of 0.1% of the catalyst being made during the polymerization at the end of 4, 6, and 20 hours. The monomeric material in succeeding runs consists of a mixture of 2-(vinylthio)- ethyl glycidyl ether with butyl methacrylate and methyl methacrylate in the following weight ratios:
(1) 5:60:40 respectively.
(2) 10:60:40 respectively.
(3) 15:60:40 respectively.
(4) 25:60:40 respectively.
(5) 33:60:40 respectively.

The several solutions of the respective polymers and copolymers obtained are mixed with 5% of cumylsuccinic acid, coated on glass plates and baked one-half hour at 400° F. The films obtained from the polymers show increasing resistance to gasoline in proportion to the amount of glycidyl monomer therein.

EXAMPLE 8

A dispersion of a copolymer is prepared by emulsifying 95 parts by weight of n-butyl acrylate with 5 parts by weight of 2-(vinylthio)ethyl glycidyl ether in about 300 parts by weight of water with about 6 parts by weight of an ethylene oxide condensation product of an octyl phenol containing between 30 and 50 oxyethylene units per molecule. To the emulsified monomers at 15° C., 0.12% by weight of ammonium persulfate, 0.16% of sodium hydrosulfite, and a small amount of ferrous sulfate (1 to 5 p.p.m.) are added to catalyze the copolymerization which is carried out for a period of about fifteen minutes during which the temperature rose to 45° C.

Portions of the resin dispersion are diluted to polymer concentrations of 17%, 13%, and 9% respectively and the resulting dispersions are each divided into two parts. To one part of each dispersion of different concentration, 1% of sulfuric acid is added. The other parts of different concentrations are uncatalyzed. Each of the six dispersions are then applied in a pad to separate pieces of a wool flannel each 10 inches square (2/2 right hand 45° twill, 55 x 44; S-twist in ends, Z-twist in inches) as described above. After drying 10 minutes at 240° F., followed by curing for 10 minutes at 300° F., it is found that the proportions of copolymer applied to the fabric by the dispersions of 9%, 13%, and 17% concentrations are about 2.5%, 3.5%, and 4.5% respectively of the weight of the fabric. The shrinkages of the treated fabrics after the five-hour wash described hereinabove are summarized in Table I. The untreated control shrank 59% after such a wash.

Table I

| Run | Copolymer applied to fabric, percent | Catalyst | Shrinkage, percent |
|---|---|---|---|
| a | 2.5 | No | [1] 5.5 |
| b | 2.5 | Yes | 16 |
| c | 3.5 | No | [1] 1 |
| d | 3.5 | Yes | 8 |
| e | 4.5 | No | [1] 0 |
| f | 4.5 | Yes | 3 |

[1] Average of 2 runs.

EXAMPLE 9

The procedure of Example 8 is followed except that 90 parts of n-butyl acrylate are copolymerized with 10 parts of 2-(vinylthio)ethyl glycidyl ether. The wash results are summarized in Table II. The control fabric shrank 59%.

Table II

| Run | Copolymer applied to fabric, percent | Catalyst | Shrinkage, percent |
|---|---|---|---|
| a | 2.5 | No | 7 |
| b | 2.5 | Yes | 12 |
| c | 3.5 | No | 2 |
| d | 3.5 | Yes | 3 |
| e | 4.5 | No | 0 |
| f | 4.5 | Yes | 0 |

EXAMPLE 10

A mixture of methyl methacrylate, methacrylic acid, and 2-(vinylthio)ethyl glycidyl ether in proportions by weight of 87:8:5 with 0.022% of benzoyl peroxide (based on the weight of monomers) is molded into a sheet 12" by 4" by 0.25" at 110° C. A tough, soft sheet is obtained having a swelling ratio of 2:2 in chloroform indicating a high degree of cross-linking.

It is to be understood that changes and variations may be made without departing from the spirit and scope of the invention as defined in the appended claims.

We claim:

1. A thermoplastic addition polymer comprising polymerized in the chain of the polymer molecule a plurality of units of the formula

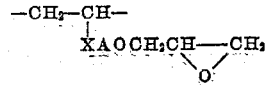

where
X is selected from the group consisting of O and S, and
A is selected from the group consisting of alkylene groups having 2 to 12 carbon atoms; alkylene groups having 2 to 12 carbon atoms substituted with a member selected from the group consisting of cyclohexyl, phenyl, chlorophenyl, and benzyl; and groups of the general formula $-(C_nH_{2n}X)_xC_nH_{2n}-$ wherein $n$ is an integer having a value of 2 to 12 and $x$ is an integer having a value of 1 to 5, any other units present being units of copolymerizable unsaturated molecules having a single carbon to carbon unsaturation.

2. A thermoplastic addition polymer comprising polymerized in the chain of the polymer molecule a plurality of units of the formula

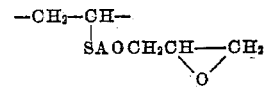

where A is an alkylene group having 2 to 12 carbon atoms, any other units present being units of copolymerizable unsaturated molecules having a single carbon to carbon unsaturation.

3. A thermoplastic addition polymer comprising polymerized in the chain of the polymer molecule a plurality of units of the formula

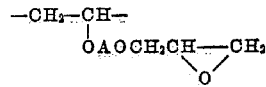

where A is an alkylene group having 2 to 12 carbon atoms, any other units present being units of copolymerizable unsaturated molecules having a single carbon to carbon unsaturation.

4. A thermoplastic addition copolymer of 2-(vinylthio)ethyl glycidyl ether and butyl methacrylate.

5. A thermoplastic addition copolymer of 2-(vinylthio)ethyl glycidyl ether and methyl methacrylate.

6. A thermoplastic addition copolymer of 2-(vinylthio)ethyl glycidyl ether and methyl methacrylate and butyl methacrylate.

7. A thermoplastic addition copolymer of 2-(vinylthio)ethyl glycidyl ether and acrylonitrile.

8. A thermoplastic addition copolymer of 2-(vinylthio)ethyl glycidyl ether and vinyl chloride.

9. A thermoplastic addition copolymer of 2-(vinyloxy)ethyl glycidyl ether and maleic anhydride.

10. An insoluble product obtained by cross-linking a thermoplastic addition polymer comprising polymerized in the chain of the polymer molecule a plurality of units of the formula

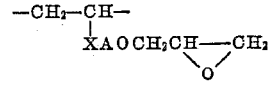

where

X is selected from the group consisting of O and S, and

A is selected from the group consisting of alkylene groups having 2 to 12 carbon atoms; alkylene groups having 2 to 12 carbon atoms substituted with a member selected from the group consisting of cyclohexyl, phenyl, chlorophenyl, and benzyl; and groups of the general formula —$(C_nH_{2n}X)_xC_nH_{2n}$— wherein $n$ is an integer having a value of 2 to 12 and $x$ is an integer having a value of 1 to 5, any other units present being units of copolymerizable unsaturated molecules having a single carbon to carbon unsaturation, the cross-linking resulting from reaction of the epoxy groups.

11. An insoluble product obtained by cross-linking a thermoplastic addition polymer comprising polymerized in the chain of the polymer molecule a plurality of units of the formula

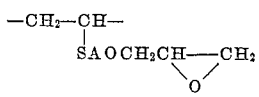

where A is an alkylene group having 2 to 12 carbon atoms, any other units present being units of copolymerizable unsaturated molecules having a single carbon to carbon unsaturation, the cross-linking resulting from reaction of the epoxy groups.

12. An insoluble product obtained by cross-linking a thermoplastic addition polymer comprising polymerized in the chain of the polymer molecule a plurality of units of the formula

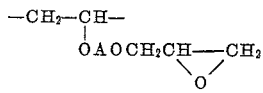

where A is an alkylene group having 2 to 12 carbon atoms, any other units present being units of copolymerizable unsaturated molecules having a single carbon to carbon unsaturation, the cross-linking resulting from reaction of the epoxy groups.

13. An insoluble product obtained by heating a thermoplastic addition copolymer of 2-(vinylthio)ethyl glycidyl ether, methyl methacrylate, and methacrylic acid to effect cross-linking through reaction of the epoxy groups.

14. A thermoplastic addition copolymer of a mixture of monomers comprising at least one monomer of the formula

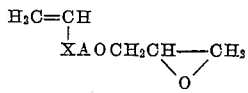

and another copolymerizable monoethylenically unsaturated monomer which under the conditions of copolymerization reacts with the aforesaid monomer primarily through their ethylenically unsaturated linkages, X being a member selected from the group consisting of O and S, and A being a member selected from the group consisting of alkylene groups having 2 to 12 carbon atoms; alkylene groups having 2 to 12 carbon atoms substituted with a member selected from the group consisting of cyclohexyl, phenyl, chlorophenyl, and benzyl; and groups of the general formula —$(C_nH_{2n}X)_xC_nH_{2n}$— wherein $n$ is an integer having a value of 2 to 12 and $x$ is an integer having a value of 1 to 5.

15. A thermoplastic addition copolymer of a mixture of monomers comprising at least one monomer of the formula

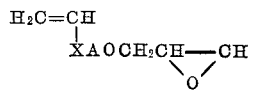

and at least one ester of an acid of the formula $$H_2C=C-(CH_2)_{m-1}H$$
$$\phantom{H_2C=}COOH$$

wherein $m$ is an integer having a value of 1 to 2,

X being a member selected from the group consisting of O and S, and

A being a member selected from the group consisting of alkylene groups having 2 to 12 carbon atoms; alkylene groups having 2 to 12 carbon atoms substituted with a member selected from the group consisting of cyclohexyl, phenyl, chlorophenyl, and benzyl; and groups of the general formula —$(C_nH_{2n}X)_xC_nH_{2n}$— wherein $n$ is an integer having a value of 2 to 12 and $x$ is an integer having a value of 1 to 5.

16. An article of manufacture comprising a textile fabric of wool stabilized by reaction therewith, at a temperature of about 150° to 450° C. for 10 seconds to one hour, of a deposit of an impregnant comprising a polymer as defined in claim 1.

17. A composition of matter comprising a copolymerization product selected from the group consisting of (1) thermoplastic addition copolymers of a mixture of monomers comprising at least one monomer of the formula

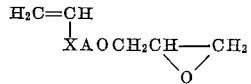

and another copolymerizable monoethylenically unsaturated monomer which under the conditions of copolymerization reacts with the aforesaid monomer primarily through their ethylenically unsaturated linkages, X being a member selected from the group consisting of O and S, and A being a member selected from the group consisting of alkylene groups having 2 to 12 carbon atoms; alkylene groups having 2 to 12 carbon atoms substituted with a member selected from the group consisting of cyclohexyl, phenyl, chlorophenyl, and benzyl; and groups of the general formula —$(C_nH_{2n}X)_xC_nH_{2n}$— wherein $n$ is an integer having a value of 2 to 12 and $x$ is an integer having a value of 1 to 5, and (2) cross-linked addition-condensation copolymers of a mixture of monomers comprising at least one monomer of the formula

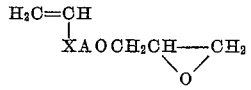

and another copolymerizable monoethylenically unsaturated monomer, the symbols X and A being as defined herein, cross-linking resulting from reaction of the epoxy groups.

References Cited in the file of this patent
UNITED STATES PATENTS

| | | |
|---|---|---|
| 1,971,662 | Schmidt et al. | Aug. 28, 1934 |
| 2,450,234 | Evans et al. | Dec. 16, 1948 |
| 2,676,166 | Webers | Apr. 20, 1954 |
| 2,687,405 | Rothrock et al. | Aug. 24, 1954 |
| 2,752,269 | Condo et al. | June 26, 1956 |
| 2,774,691 | Schroeder et al. | Dec. 18, 1956 |
| 2,864,804 | Shokal | Dec. 16, 1958 |